United States Patent [19]
Rodi

[11] Patent Number: 5,806,430
[45] Date of Patent: Sep. 15, 1998

[54] DIGITAL PRINTING PRESS WITH REGISTER ADJUSTMENT AND METHOD FOR CORRECTING REGISTER ERRORS THEREIN

[76] Inventor: Anton Rodi, Karlsruher Strasse 12, D-69181 Leimen, Germany

[21] Appl. No.: 740,254

[22] Filed: Oct. 25, 1996

[30] Foreign Application Priority Data

Oct. 25, 1995 [DE] Germany ............... 295 16 830 U
Aug. 14, 1996 [DE] Germany ............... 196 32 674.5

[51] Int. Cl.⁶ .......................... B41F 1/66; B41F 13/24
[52] U.S. Cl. .................. 101/484; 101/181; 101/211; 101/248; 395/117
[58] Field of Search ...................... 101/248, 211, 101/484, 485, 486, 181; 395/117

[56] References Cited

U.S. PATENT DOCUMENTS

| | | | |
|---|---|---|---|
| 4,534,288 | 8/1985 | Brovman ............................... | 101/211 |
| 4,553,478 | 11/1985 | Greiner et al. ....................... | 101/248 |
| 4,690,051 | 9/1987 | Kishine et al. ....................... | 101/211 |
| 4,719,575 | 1/1988 | Gnuechtel ............................. | 101/248 |
| 5,036,764 | 8/1991 | Rodi ..................................... | 701/211 |
| 5,076,163 | 12/1991 | Sainio ................................... | 101/486 |
| 5,181,257 | 1/1993 | Steiner et al. ..................... | 250/559.04 |
| 5,215,011 | 6/1993 | Monney ................................. | 101/248 |
| 5,224,640 | 7/1993 | Fokos et al. ......................... | 101/248 |
| 5,295,236 | 3/1994 | Bjorge et al. . | |
| 5,299,308 | 3/1994 | Suzuki et al. ....................... | 395/162 |
| 5,325,474 | 6/1994 | Kumazaki et al. .................. | 395/133 |
| 5,365,847 | 11/1994 | Pers . | |
| 5,499,093 | 3/1996 | Aerens et al. ....................... | 101/211 |
| 5,634,091 | 5/1997 | Sands et al. ......................... | 101/453 |

FOREIGN PATENT DOCUMENTS 32 32 171   7/1983   Germany .

*Primary Examiner*—Eugene H. Eickholt
*Attorney, Agent, or Firm*—Herbert L. Lerner; Laurence A. Greenberg

[57] ABSTRACT

A printing press includes a plurality of individual digital imaging units. A raster image processor receives image data in a machine-independent data format, generates machine-specific image data from the machine-independent image data and delivers the machine-specific image data to the individual imaging units. An error detection device ascertains register errors of the imaging units and generates corresponding register error signals. An image data modification circuit connected upstream of the raster image processor communicates with the error detection device, for modifying the image data in the machine-independent format on the basis of the register error signals and delivering the modified machine-independent image data to the raster image processor. A method for correcting register errors in a printing press includes receiving image data in a machine-independent data format, generating machine-specific image data from the machine-independent image data, and delivering the machine-specific image data to a plurality of individual imaging units, with a raster image processor. Register errors are corrected by manipulation of the machine-independent image data.

9 Claims, 4 Drawing Sheets

DIGITAL PRINTING PRESS WITH REGISTER ADJUSTMENT AND METHOD FOR CORRECTING REGISTER ERRORS THEREIN

BACKGROUND OF THE INVENTION

Field of the Invention

The invention relates to a printing press for automatic register adjustment of a plurality of digital imaging units, such as digital printing units or plate exposure units, in a number that corresponds to the number of color components needed to make up the image or picture. The invention also relates to a method for correcting register errors in the printing press.

Such a printing press uses electronic image data that represent the pictures to be printed and that are produced outside the printing press in some generally conventional, machine-independent format, a so-called POSTSCRIPT format. Those image data are supplied to a central control unit of the printing press, a so-called raster image processor, that prepares the image data for the printing process by producing a digital pixel pattern for each color to be printed, the pattern being adapted to the imaging units. Each pixel pattern is delivered through a side buffer to the respective imaging unit, which then generates a visible printed image pixel by pixel on a substrate.

The substrate may be a material for imprinting, such as paper. The imaging units may, for instance, be ink jet printing units, having ink jets which are triggered pixel by pixel, so as to produce a printed image directly on the paper. Alternatively, the imaging units may be digital printing units, which work by an indirect process in which a writing head on a movable intermediate carrier, such as a rotating cylinder, generates a latent-charge image that corresponds to the digital pixel pattern. The latent-charge image is developed by an inking unit, by applying ink to the intermediate carrier in accordance with the charge distribution, and the ink is then transferred to the paper and fixed thereon.

Alternatively, the substrate may be a premounted printing form to which images are applied directly in accordance with the digital image information with the aid of plate exposure units (in computer-to-press technology).

A decisive characteristic for the quality of the printed product is the attainable accuracy of registration. That is a measure for the precision with which the imaging units place the individual color separations on top of one another.

In practice, only limited registration accuracy is ever attainable. The main reason therefor is mechanical tolerances. Process-dictated interfering factors which are also involved include, for instance, the spreading of moisture on the printable substrate.

Due to those inadequacies, spatial offsets arise between the individual color separations. They can always be described as a combination of the following four basic types of error:

In a circumferential register error, the color separation is shifted in the direction of motion of the printable substrate.

In a side register error, the color separation is shifted at right angles to the direction of motion of the printable substrate.

In a skewed register error, the color separation is inclined at an angle to the direction of motion of the printable substrate.

In image stretching or compression, the length of the color separation is changed in the direction of motion of the printable substrate.

In conventional printing presses, circumferential, side and skewed register errors as a rule are corrected mechanically. For instance, adjusting devices are provided, by way of which the plate cylinders of the individual printing units can be rotated or shifted relative to one another by the applicable amount of the error. That allows incremental improvement in the accuracy of registration. In order to compensate for stretching errors, compression of the printed image can be attained, on one hand, by lining the printing plate. On the other hand, the possibility exists of manipulating the printing forms appropriately in advance.

All in all, considerable effort is needed to mechanically correct register and stretching errors. Every printing unit must be equipped with appropriate adjusting devices. Moreover, the printer or machine operator must have a very great deal of experience in order to achieve the desired goal of high registration accuracy.

The aforementioned digital printing presses differ from conventional printing presses, among other aspects, in that printing forms which have been exposed to light in final form are no longer installed. When digital plate exposure units are used, the printing forms are firmly mounted on a cylinder before being exposed, and in the aforementioned digital printing units, instead of printing forms, there are latent images on a cylinder firmly supported in the printing press or on a belt running around the cylinder. In that case, correction of register errors can be carried out by adjusting the imaging units.

In U.S. Pat. No. 5,365,847, a control system for such a printing press is described, in which in a central control unit, reference images are created that directly represent the ink or optical density distribution on a cylinder and are delivered to imaging units for the cylinders. The cylinders include sensors that detect register errors between images produced on successive cylinders. The central control unit modifies the reference images with the aid of the information furnished by the sensors in order to correct the register errors automatically.

The way in which register errors are corrected in detail is not described in that patent. One possibility is shifting of the reference images pixel by pixel. However, that would take a very great deal of computer and memory capacity. Moreover, a suitable correction device has to be adapted to the particular printing press, since the data to be corrected are machine-specific data.

SUMMARY OF THE INVENTION

It is accordingly an object of the invention to provide a digital printing press with register adjustment and a method for correcting register errors therein, which overcome the hereinafore-mentioned disadvantages of the heretofore-known devices and methods of this general type and which provide a simple, universally usable correction device and method for register and stretching errors between imaging units.

With the foregoing and other objects in view there is provided, in accordance with the invention, a printing press, comprising a plurality of individual digital imaging units; a raster image processor receiving image data in a machine-independent data format, generating machine-specific image data from the machine-independent image data and delivering the machine-specific image data to the individual imaging units; an error detection device ascertaining register errors of the imaging units and generating corresponding register error signals; and an image data modification circuit connected upstream of the raster image processor and communicating with the error detection device, for modifying the image data in the machine-independent format on the basis of the register error signals and delivering the modified machine-independent image data to the raster image processor.

In accordance with another feature of the invention, the image data modification circuit receives the image data as PostScript data, modifies individual parameters in the PostScript data, and outputs the modified PostScript data to the raster image processor.

In accordance with a further feature of the invention, the error detection device includes at least two sensors mutually spaced apart above a substrate on which images are to be printed and an evaluation circuit connected to the sensors and to the image data modification circuit.

In accordance with an added feature of the invention, there is provided a data memory for the register error signals through which the evaluation circuit and the image data modification circuit communicate with one another.

In accordance with an additional feature of the invention, the sensors are optical sensors responding to register marks produced on the substrate by the imaging units.

In accordance with yet another feature of the invention, the register marks are right triangles mutually spaced apart on the substrate, and one cathetus of each of the triangles extends parallel to one side of the substrate.

With the objects of the invention in view there is also provided a printing press, comprising a plurality of individual digital imaging units; a raster image processor having a color separation stage for separating input machine-independent image (POSTSCRIPT) data into machine-independent image data for individual colors, a plurality of register correction stages each receiving the machine-independent image data for a single color from the color separation stage, and a plurality of screen converters for converting the machine-independent image data for single colors into machine-specific image data for the individual imaging units; and an input device (data memory) connected to the register correction stages and disposed outside the raster image processor for register error signals.

With the objects of the invention in view there is additionally provided a method for correcting register errors in a printing press, which comprises receiving image data in a machine-independent data format, generating machine-specific image data from the machine-independent image data, and delivering the machine-specific image data to a plurality of individual imaging units, with a raster image processor; and correcting register errors by manipulation of the machine-independent image data.

In accordance with another mode of the invention, there is provided a method which comprises detecting the register errors with sensors disposed above a substrate on which images are to be printed, for generating register error signals to manipulate the machine-independent image data.

In accordance with a concomitant mode of the invention, there is provided a method which comprises manipulating the machine-independent image data by a press operator.

According to the invention, the correction of register errors is effected not by modifying the image data for the cylinders but rather by modifying the original image data supplied to the raster image processor, without changing its machine-independent format. Data sets in a format, such as PostScript, include individual parameters which indicate, for instance, the coordinate origin, the angular position of the complete image, and the dimensions of the complete image. Only a few numerical values therefore need to be modified because of the register error signals. Moreover, the circuit that performs this modification can be constructed without regard to any machine-specific properties, and thus in principle it can be used by any of the types of digital printing presses mentioned above.

The capability of varying the original image data supplied to the raster image processor can be utilized not only for the correction of register errors, according to the invention. It also affords the possibility of direct intervention by a press operator. Even if a printing press, because of its precision of construction or with the aid of correction devices, should produce theoretically ideal printed products, in practical operation this will often not be achieved, because of unpredictable factors and inadequacies. It is therefore desirable for the press operator to have the capability of making modifications, if in his or her judgment that should be necessary. To that end, adjusting devices can be provided with which the press operator can vary individual parameters in the original image data in a targeted way. These parameters may be not merely the parameters for the aforementioned registers. There are in fact other parameters in the original image data for which it is appropriate to provide a direct capability of manipulation by the press operator. For instance, it may be provided that the operator can individually vary the coloration of the individual color separations, if he or she thinks it necessary, and the manipulation can also be carried out zonally. In that case, neither conventional mechanical adjusting devices nor technically complicated devices for manipulating bitmap data are needed.

Other features which are considered as characteristic for the invention are set forth in the appended claims.

Although the invention is illustrated and described herein as embodied in a digital printing press with register adjustment and a method for correcting register errors therein, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
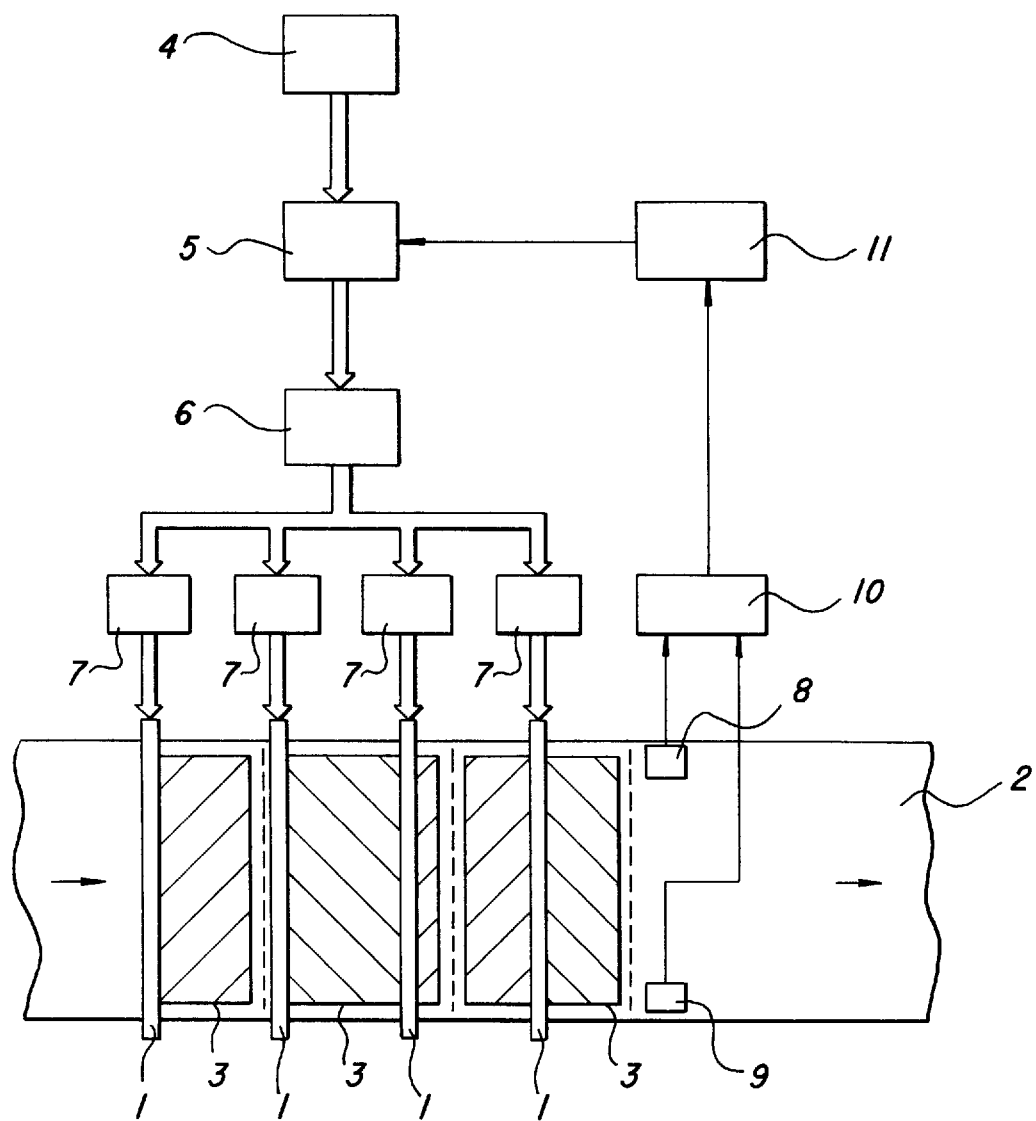
FIG. 1 is a basic fragmentary, diagrammatic, plan view and block circuit diagram of a digital printing press with an automatic register adjustment.

Referring now to the figures of the drawings in detail and first, particularly, to FIG. 1 thereof, there are seen four digital printing units 1, disposed in a row, past which a printable substrate 2 moves in the direction of arrows. The printing units 1 each extend crosswise across the printable substrate 2 and successively print colored partial images on top of one another on the printable substrate 2, for instance with the colors cyan, magenta, yellow and black, as represented by differently shaded areas 3.

The printable substrate 2 may be a cohesive web of paper, as in the case of roll-fed printing presses, or individual sheets which are fed successively along the printing units 1, for instance on a conveyor belt.

All types of printing devices that can be triggered pixel by pixel by electrical signals to produce visible printed images on the printable substrate 2 can be considered for the printing units 1. Examples are ink jet arrays or printing units with a writing head that produces latent-charge images on a cylinder, that pick up printing ink from an inking unit in accordance with the charge distribution and transfer it to the printable substrate 2.

An input circuit 4 forms a data interface with a preceding computer for prepress layout (in desktop publishing), which furnishes the image data of a printing job in a machine-independent page description language. The exemplary embodiments used in this case use the page description language known as POSTSCRIPT (ADOBE Systems, Inc., PostScript Language Reference Manual, 2nd Edition, Addison-Wesley Publishing Company, 1994), but any other suitable page description language can also be used. The input circuit 4 carries the POSTSCRIPT data through an image data modification circuit 5, which will be described in further detail below, to a raster image processor 6, which is a fixed component of the digital printing press and has the task of first separating the image data into the process colors and then screening them in a manner suited to the particular press. The mode of operation of the raster image processor 6 depends in detail on the page description language used and will be apparent therefrom.

The raster image processor 6 prepares the POSTSCRIPT data for the particular printing process, by preparing a machine-specific digital color separation for each color to be printed, such as a pixel pattern that represents the color intensity and ink distribution to be produced on the printable substrate 2.

The digital color separations are placed in associated side buffers 7 and after the conclusion of processing in the raster image processor 6, are transmitted to the printing units 1, which apply visible printed images accordingly to the printable substrate 2.

A respective optical sensor 8 and 9, which is disposed on each side of the printable substrate 2 (as viewed in the transport direction), is aimed at a small location on the surface of the printable substrate 2 and thus scans the printable substrate 2 linearly as the printable substrate 2 moves in the transport direction. The sensors 8, 9 generate signals that are proportional to the color intensity at the scanning locations and carry them to an evaluation circuit 10. The evaluation circuit 10 generates register error signals on the basis of the signals from the sensors 8, 9. The error signals are stored in a memory 11 if necessary and then delivered to the image data modification circuit 5.

Before a more-detailed description of the detection of register errors and their correction is described, the various register errors that can occur will first be explained in conjunction with FIGS. 2a–2d. These figures each show a sheet or a portion of a printable substrate, before and after it passes the printing units 1.

Figure 2A:
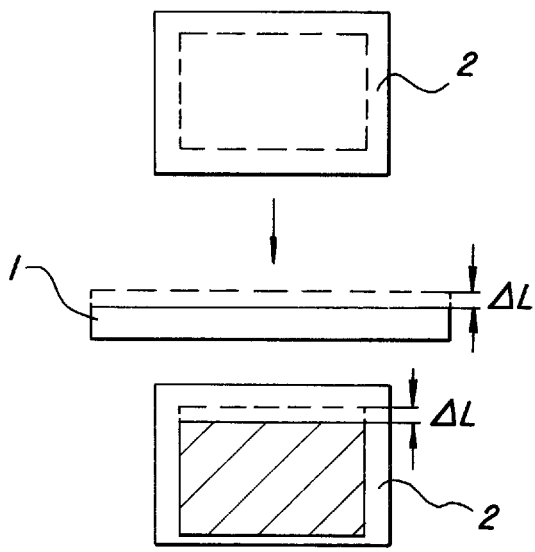
FIGS. 2a–2d are plan views of various register errors.
Figure 2B:
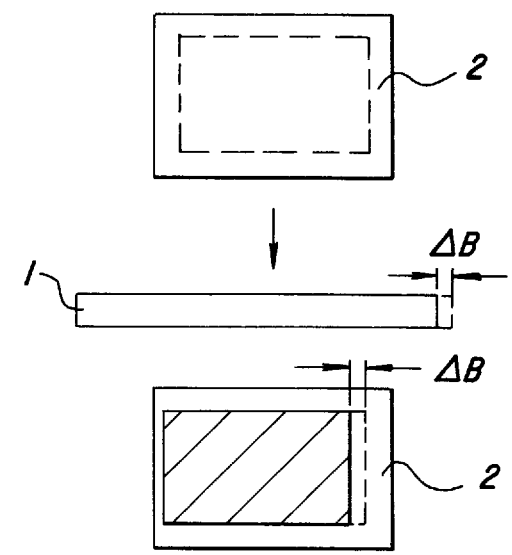
Figure 2C:
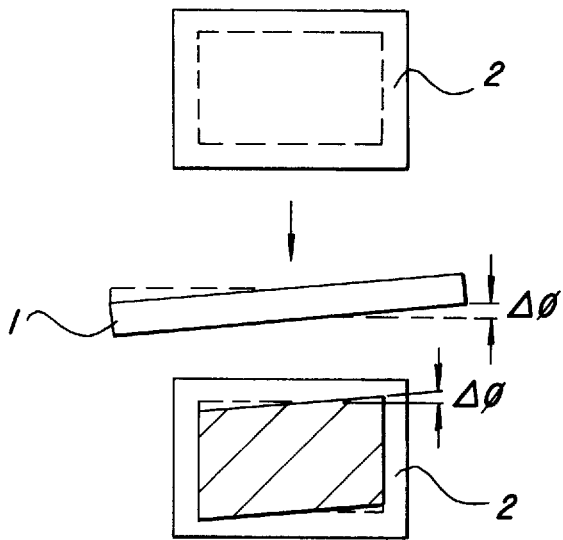
Figure 2D:
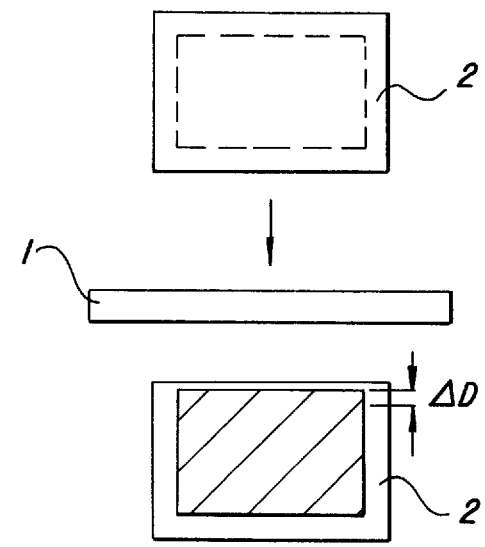

FIG. 2a shows that in a circumferential register error, the resultant color separation is displaced by an amount ΔL in the direction of motion of the printable substrate. FIG. 2b shows that a side register error causes a corresponding displacement by an amount ΔB at right angles to the direction of motion. As is shown in FIG. 2c, a skewed register error leads to an inclination of the color separation by an angle Δϕ in the direction of motion. As is shown in FIG. 2d, in the event of stretching or compression of an image, a change of length by an amount ΔD occurs.

Under steady-state operating conditions, these register errors are constant. They can therefore be determined with the aid of the sensors 8 and 9, which form an error ascertaining device, and can then be corrected with the help of the image data modification circuit 5. This will be described in the form of an example below with reference to FIGS. 3a and 3b.

The determination of the register errors can be carried out in the context of a calibrating run that is started as needed by the press operator. During such a calibration operation, each printing unit prints lateral register marks 12 on the printable substrate 2. In this exemplary embodiment, the register marks 12 are two lateral rows of right triangles, one cathetus of which extends parallel and the other cathetus of which extends perpendicular to the direction of motion of the printable substrate 2. This is shown on the left-hand sides of FIGS. 3a and 3b. The individual register marks 12 are each produced, for instance, by whichever printing unit in FIG. 1 is located at the appropriate location in the row of printing units 1, as is suggested by corresponding shading of the register marks 12.

Figure 3A:
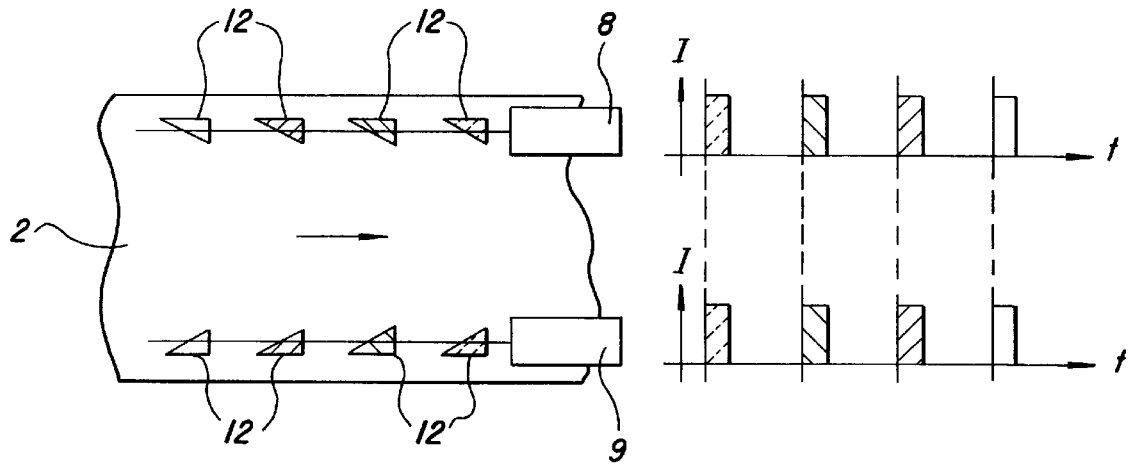
FIGS. 3a and 3b are fragmentary, plan views showing one example for measuring the register errors.
Figure 3B:
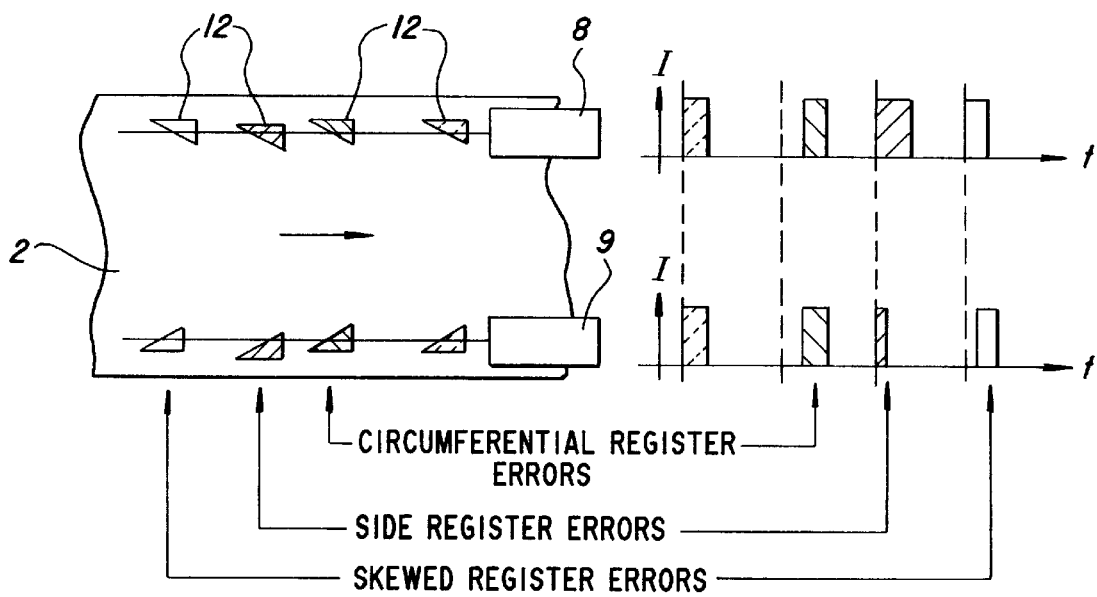

When the register marks 12 pass under the sensors 8, 9, each sensor 8, 9 generates a train of square or rectangular pulses, as is shown on the right-hand sides of FIGS. 3a and 3b. The association of the pulses with the corresponding register marks 12 or printing units 1 is represented in turn by corresponding shadings.

In the error-free case, as FIG. 3a shows, the two pulse trains are in phase, and they have equidistantly distributed square or rectangular pulses of equal width, as is shown in the graphs on the right in FIG. 3a, which show standardized signal intensities I of the sensors 8 and 9 over time t.

FIG. 3b illustrates a situation in which register errors occur. The printing unit 1 that has produced the register marks 12 located closest to the sensors 8, 9 is chosen to be a reference printing unit, of which it is assumed in this example that it is producing correctly located register marks 12 on the printable substrate 2. As a result of various register errors, the following register marks 12 on the printable substrate 2 are shifted from the ideal positions shown in FIG. 3a, and the resultant signals of the sensors 8, 9 deviate as follows from the ideal shape, with reference being made to a the corresponding pulse graph on the right-hand side of FIG. 3b.

In the case of a circumferential register error, the leading edges of the two associated pulses are shifted by the same amount and a side register error is expressed in different pulse widths.

In a skewed register error, the leading edges of the corresponding pulses are shifted relative to one another.

Finally, a sheet stretch causes a uniform enlargement of the spacings between the pulses of an individual printing unit (not shown in FIG. 3b).

In this way, an unequivocal relationship between error causes and symptoms is furnished. This assures that even a superposition of all of the error types within one printing unit can be detected and correctly evaluated.

The evaluation circuit 10 of FIG. 1 generates register error signals on the basis of this relationship.

The evaluation circuit 10, in a first portion, determines the amount and direction by which the leading edges of each two associated pulses of the sensors 8, 9 are shifted on the time axis, or in other words the displacement from the ideal positions, shown on the right in FIG. 3a, relative to the reference printing unit 1 that has produced the register marks 12 located closest to the sensors 8, 9. It is sufficient to compare the average over time of the two leading edges with the ideal position. This is carried out successively for every color separation, and the variables thus obtained represent the circumferential register errors for the various color separations relative to the reference printing unit 1.

In a second portion, the evaluation circuit 10 forms the difference of the pulse width of each two associated pulses of the sensors 8, 9. These differences indicate the side register errors of the respective color separations.

In a third portion, the evaluation circuit 10 determines the time difference between the leading edges of two associated pulses of the sensors 8, 9 at a time. This time difference represents the skewed register error of the particular color separation.

In a fourth portion, the evaluation circuit determines the time difference between the leading edges of two associated pulses of the sensors 8, 9, or their average, with the fourth successive pulses or their average, that is with the leading edges of the pulses which furnish the register marks that the same printing unit 1 has next printed on the printable substrate 2 (the register marks following the register marks 12 are no longer visible in FIG. 3b, but they follow the illustrated register marks 12 at a distance corresponding to the length of the printed image). It suffices for this time difference to be determined through the reference printing unit 1 that has produced the register marks 12 located closest to the sensors 8, 9 in FIGS. 3a, 3b. If this time difference is greater than the time difference between two press cycles or increments, then sheet rotation is involved, having a magnitude which is defined by the amount of the deviation from the press cycle.

The variables of circumferential register, side register error, skewed register error and sheet stretching that are determined in the evaluation circuit 10 form the register error signals for the individual color separations, and in the ideal case they are zero. The register error signals are machine-specific parameters, which just like a number of other variables (colors or inks, screen or raster width, paper size, etc.) are of significance for data preparation in the raster image processor 6 or for layout. In order to assure that they can be called up at any time, these data can be stored in the form of a POSTSCRIPT printer description data file in the memory 11.

The register error signals are supplied to the image data modification circuit 5, in which the original data set that is present as a POSTSCRIPT data file, is modified in the following way before being delivered to the raster image processor 6.

Compensation for circumferential and side register errors is carried out by corresponding manipulation of the POSTSCRIPT parameter for the coordinate origin, to which the spatial disposition of all of the image components relates.

Skewed register errors can be compensated for by inclining the total image content, which can be carried out in POSTSCRIPT by varying one further parameter.

Stretching errors can be corrected by compressing the image content. Once again, this can be carried out in POSTSCRIPT by adapting a single parameter.

Thus only four numerical values have to be purposefully varied in order to compensate for the mechanical inadequacies of the single printing unit. However, it should be noted that this corrective provision must be performed individually for each of the four color separations. Nevertheless, this is not a problem since the raster image processor 6 generates the individual color separations in succession. It is therefore possible to adapt the various parameters to the particular color before each passage through the raster image processor 6.

The form and disposition of the register marks as described above allows extremely simple detection and determination of the register errors. Moreover, numerous other suitable forms and configurations of register marks are also conceivable. If the printable substrate is cut after being printed, the edge of the printable substrate can also be provided with suitable register marks, so that the register adjustment can be carried out continuously throughout press operation. Moreover, it is conceivable to use invisible register marks that are scanned by suitable sensors. Under some circumstances, the printed images themselves or elements of them may also be used as register marks.

As already mentioned, the described register error correction can also be employed in the context of computer-to-press technology. In order not to harm the image areas on the printing forms from register marks, the plate exposure units can, for instance, produce register marks on the printing forms that are located outside the later image regions.

In the above-described exemplary embodiment, the image data are modified before being delivered to the raster image processor. Alternatively, the image data may be modified in the context of processing in the raster image processor. One example of register adjustment through the raster image processor itself is shown in FIG. 4, in which elements that match those elements of FIG. 1 are provided with the same reference numerals.

The various processing steps within one pass through a raster image processor 13 will be described in conjunction with FIG. 4 for an example of a printing job that is in the PostScript page description language.

Figure 4:
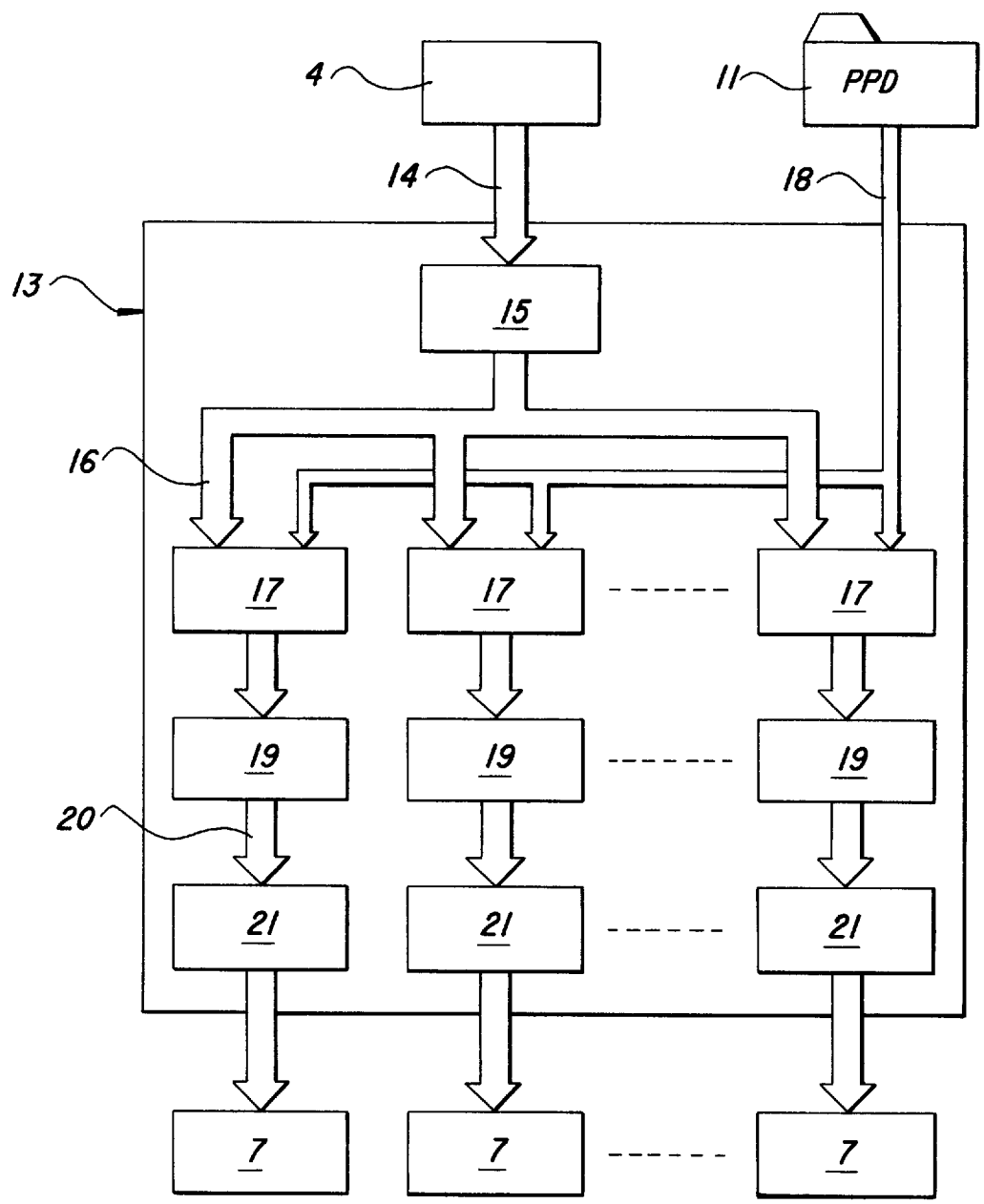
FIG. 4 is a flow diagram used to explain the mode of operation of a raster image processor according to a further exemplary embodiment.

In FIG. 4, a spooler or other suitable input circuit in this case furnishes a POSTSCRIPT data file 14 that describes an M-colored printed image. The POSTSCRIPT data file 14 is supplied to a color separation stage 15 of the raster image processor. In the color separation stage 15, the POSTSCRIPT data file 14 is separated into new POSTSCRIPT data files 16, each of which specifies a single color separation.

The correction of the register errors then takes place on the basis of these previously separated data, which are still in a machine-independent or equipment-independent format, through the use of bar-specific shifting, stretching or compression of the entire image content. This is carried out in N register correction stages 17, each of which receives one of the POSTSCRIPT data files 16. The register correction stages 17 also receive control parameters 18 for correcting the register errors of each color separation. The control parameters 18 may either be input for correction by direct intervention of the press operator, or they are taken in the form of machine-specific so-called BDT data files (POSTSCRIPT printer description files) for register error data from the memory 11, in which they are been placed, for instance, by an evaluation circuit 10 as in FIG. 1. The control parameters 18 are entered at a suitable location into the associated POSTSCRIPT data files 16 in the register correction stages 17.

The thus-manipulated POSTSCRIPT data files, which the N color separations describe, are then delivered to N screen or raster converters 19, in which they are converted into N screened or rastered half-tone images 20. If necessary, the individual screened or rastered half-tone images 20 are adapted in machine-specific so-called screening stages 21 to the existing properties of the printing process, before being delivered to the side buffers 7 and from the side buffers 7 to the printing units 1 shown in FIG. 1.

I claim:

1. A printing press system, comprising:

a digital printing press, including:

a plurality of individual digital imaging units for printing printable substrates;

a raster image processor receiving image data in a machine-independent data format, generating machine-specific image data from the machine-independent image data and delivering the machine-specific image data to said individual imaging units;

an error detection device ascertaining register errors of said imaging units and generating corresponding register error signals; and an image data modification circuit connected upstream of said raster image processor and communicating with said error detection device, for modifying the image data in the machine-independent format on the basis of the register error signals and delivering the modified machine-independent image data to the raster image processor.

2. The printing press according to claim 1, wherein said image data modification circuit receives the image data as page description language data, modifies individual parameters in the page description language data, and outputs the modified page description language data to said raster image processor.

3. The printing press according to claim 1, wherein said error detection device includes at least two sensors mutually spaced apart above a substrate on which images are to be printed and an evaluation circuit connected to said sensors and to said image data modification circuit.

4. The printing press according to claim 3, including a data memory for the register error signals through which said evaluation circuit and said image data modification circuit communicate with one another.

5. The printing press according to claim 3, wherein said sensors are optical sensors responding to register marks produced on the substrate by said imaging units.

6. The printing press according to claim 5, wherein said register marks are right triangles mutually spaced apart on the substrate, and one cathetus of each of said triangles extends parallel to one side of the substrate.

7. A method for correcting register errors in a digital printing press, which comprises:

receiving image data in a machine-independent data format, generating machine-specific image data from the machine-independent image data, and delivering the machine-specific image data to a plurality of individual digital imaging units, with a raster image processor; and correcting register errors by manipulation of the machine-independent image data.

8. The method according to claim 7, which comprises detecting the register errors with sensors disposed above a substrate on which images are to be printed, for generating register error signals to manipulate the machine-independent image data.

9. The method according to claim 7, which comprises manipulating the machine-independent image data by a press operator.

* * * * *